United States Patent
Yoshii et al.

(10) Patent No.: US 9,561,972 B2
(45) Date of Patent: Feb. 7, 2017

(54) METHOD FOR EFFLUENT TREATMENT IN SMELTING OF NICKEL OXIDE ORE

(71) Applicant: SUMITOMO METAL MINING CO., LTD., Tokyo (JP)

(72) Inventors: Yasuo Yoshii, Tokyo (JP); Keisuke Shibayama, Tokyo (JP); Yoji Kyoda, Tokyo (JP); Yoshitomo Ozaki, Tokyo (JP); Osamu Nakai, Tokyo (JP); Hiroyuki Mitsui, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 87 days.

(21) Appl. No.: 14/419,543

(22) PCT Filed: Jun. 17, 2013

(86) PCT No.: PCT/JP2013/066589
§ 371 (c)(1),
(2) Date: Feb. 4, 2015

(87) PCT Pub. No.: WO2014/027503
PCT Pub. Date: Feb. 20, 2014

(65) Prior Publication Data
US 2015/0225269 A1  Aug. 13, 2015

(30) Foreign Application Priority Data

Aug. 13, 2012 (JP) .................................. 2012-179413

(51) Int. Cl.
*C02F 1/52* (2006.01)
*C02F 1/44* (2006.01)
(Continued)

(52) U.S. Cl.
CPC ........... *C02F 1/5236* (2013.01); *C02F 1/5245* (2013.01); *C02F 1/444* (2013.01); *C02F 2101/10* (2013.01);
(Continued)

(58) Field of Classification Search
CPC ............................. C02F 1/5236; C02F 1/5245
USPC ......................................................... 210/724
See application file for complete search history.

(56) References Cited

U.S. PATENT DOCUMENTS 3,809,549 A * 5/1974 Opratko et al. ...... C22B 23/043
423/140
4,026,773 A * 5/1977 Van Peteghem .... C22B 15/0069
205/581
(Continued)

FOREIGN PATENT DOCUMENTS

JP  H09-248576 A  9/1997
JP  2000-126510 A  5/2000
(Continued)

OTHER PUBLICATIONS

Clark, M et al., "Bauxsol (TM) Technology to Treat Acid and Metals; Applications in the Coal Industry", National Meeting of the American Society of Mining and Reclamation and the 25th West Virginia Surface Mine Drainage Task Force, Apr. 18-24, 2004, Apr. 24, 2004 (Apr. 24, 2004, pp. 293-322.
(Continued)

*Primary Examiner* — Chester Barry
(74) *Attorney, Agent, or Firm* — Oliff PLC

(57) ABSTRACT

The present invention aims at providing a method for effluent treatment, which enables the separation and recovery of a high-density and high-concentration aluminum sediment from waste water that is discharged in the smelting of a nickel oxide ore and contains aluminum ions. In the
(Continued)

present invention, an alkali and an iron-containing solid are added to waste water containing aluminum ions to form a slurry, and the slurry is allowed to stand to perform solid-liquid separation, whereby an aluminum sediment and an effluent is formed.

5 Claims, 3 Drawing Sheets
(1 of 3 Drawing Sheet(s) Filed in Color)

(51) Int. Cl.
    *C02F 103/16*     (2006.01)
    *C02F 101/10*     (2006.01)

(52) U.S. Cl.
    CPC ........ *C02F 2103/16* (2013.01); *C02F 2209/06* (2013.01); *C02F 2209/10* (2013.01)

(56) References Cited

U.S. PATENT DOCUMENTS

| | | | |
|---|---|---|---|
| 4,548,794 A * | 10/1985 | Lowenhaupt | C22B 23/043 |
| | | | 423/123 |
| 6,656,247 B1 | 12/2003 | Genik-Sas-Berezowsky et al. | |
| 2003/0146163 A1 | 8/2003 | Sasowsky et al. | |
| 2010/0018350 A1 | 1/2010 | Shibayama et al. | |
| 2010/0102007 A1 | 4/2010 | Kalo | |
| 2011/0127220 A1 | 6/2011 | Coste et al. | |
| 2013/0001173 A1 | 1/2013 | Kobayashi et al. | |

FOREIGN PATENT DOCUMENTS

| | | |
|---|---|---|
| JP | 2004-225120 A | 8/2004 |
| JP | 2005-350766 A | 12/2005 |
| JP | 2010-031302 A | 2/2010 |
| JP | 2010-207674 A | 9/2010 |
| JP | 2011-206757 A | 10/2011 |
| WO | 0234673 A2 | 5/2002 |
| WO | 2011104436 A1 | 9/2011 |

OTHER PUBLICATIONS

Jan. 2, 2016 Extended Search Report issued in European Patent Application No. 13879291.6.

Aug. 13, 2013 Search Report issued in International Application No. PCT/JP2013/066589.

* cited by examiner

METHOD FOR EFFLUENT TREATMENT IN SMELTING OF NICKEL OXIDE ORE

TECHNICAL FIELD

The present invention relates to a method for effluent treatment in the smelting of a nickel oxide ore, and more specifically, relates to a method for effluent treatment by which a high-density aluminum sediment can be formed from waste water containing aluminum ions discharged in the smelting of a nickel oxide ore.

The present application claims priority based on Japanese Patent Application No. 2012-179413 filed on Aug. 13, 2012 in Japan, and this application is incorporated herein by reference.

BACKGROUND ART

In a mine of a non-ferrous metal and a plant from which waste water containing heavy metal ions is generated such as a smelter, a treatment for separating heavy metal ions as an effluent sediment from an effluent so that the heavy metal ions are not contained in a discharged effluent is conducted by providing a step of an effluent treatment.

For example, as the method for separating a heavy metal from waste water, a method including adding an alkali such as lime stone or lime hydrate to an effluent to adjust the pH of the effluent to form a slurry to thereby precipitate and fix the heavy metal as a sediment is generally performed.

Among non-ferrous metals, ores of low-grade nickel oxide ores such as lateritic ore tend to contain a relatively large amount of manganese, which is a heavy metal. In nickel smelting using a high pressure acid leach process (HPAL process), which has been frequently used in recent years, manganese remains in an effluent from which nickel has been recovered. Therefore, a method including adding an alkali to an effluent to separate manganese as a neutralized sediment is adopted so that effects that the manganese is directly discharged to thereby color rivers, and the like would not be generated.

However, in such method, there was a problem that other metal ions that are not necessary to be precipitated and separated such as magnesium also form a sediment at the same time, and thus the amount of the sediment increases. When a sediment is formed by the metal ions that are not necessary to be precipitated and separated, unpreferable effects that the use amount and cost of an alkali required for neutralization increase, the capacity of a place for disposal is pressed, and the like are caused.

Therefore, a method for selectively precipitating and separating only manganese without co-precipitating magnesium, for which precipitation is unnecessary, has been demanded.

For example, in Patent Literature 1, a method for selectively precipitating and separating only manganese without co-precipitating magnesium, by a so-called oxidation-neutralization process, which includes adjusting the pH of waste water to be in the range from 8.2 to 8.8, and blowing an oxygen gas into the waste water to maintain the redox potential to be in the range from 50 to 300 mV, is reported.

However, also in this method, magnesium and aluminum were precipitated at the same time in the case when aluminum ions were contained in the liquid, and thus problems that the neutralizer is required in an amount for neutralizing the magnesium in addition to an amount for removing the manganese, and that the amount of generation of a sediment is increased, have not been sufficiently solved.

Therefore, Patent Literature 2 indicates a method for separating aluminum including adjusting the pH of waste water to be in the range of from 4 to 6 in advance of an oxidation-neutralization treatment of the effluent. The co-precipitation of magnesium and aluminum is prevented by using this method, and thus it becomes possible to effectively separate aluminum.

However, there was a problem that the aluminum sediment formed by the method of Patent Literature 2 is a very bulky sediment and thus is voluminous in handling. This is because the particles of the aluminum sediment are fine and the moisture content in the sediment is high, and thus a considerable part of the magnesium in the effluent tends to be contained as adhesive moisture. Furthermore, since the specific gravity of the aluminum sediment is light as about 1.05 to 1.10 g/ml, which is substantially the same as that of the effluent, the sediment is difficult to settle out. In addition, there are many inconvenient characteristics such as that honeycomb airspaces are easily formed in the sediment by incorporation of air during stirring. Especially, these tendencies were significant in the case of waste water with a concentration of aluminum ions of greater than 2 g/l.

Furthermore, a thickener is frequently used in industrially performing solid-liquid separation. In an operation using a thickener, a flocculant is added, and the solid content in a slurry fed to the thickener settles out on the bottom part of the thickener and becomes a sediment called an underflow, and is suitably removed from the thickener. Since a quantity of liquid adheres to the removed underflow, it is necessary to treat the dehydrated sediment by performing fine filtration by using a filter press or the like.

At this time, an underflow in which the liquid adhered to the underflow is small, i.e., a high-concentration underflow is preferable since the size of the filtration equipment such as the thickener or filter press can be saved and the neutralizer that is added for the neutralization treatment of the adhered liquid after the separation can also be saved. However, especially in the case when a honeycomb sediment as mentioned above is formed, the substance amount of the underflow required for fine filtration is increased, and thus there are problems in costs such as increase in the capacity of the equipment in accordance with the increase in the substance amount of the underflow.

As a method for solid-liquid separation of a poorly settleable and poorly filterable slurry, for example, the method indicated in Patent Literature 3 is exemplified. The method described in Patent Literature 3 is a method for treating a poorly settleable and poorly filterable slurry containing colloidal silica, and a method for improving the settleability and filterability is suggested. Specifically, the settleability and filterability are improved by adding bentonite to a slurry containing colloidal silica.

However, this method described in Patent Literature 3 has little effect on components other than colloidal silica such as magnesium. Furthermore, since bentonite is newly added from outside, the increase in the amount of the sediment by the addition of bentonite is not negligible, and thus there is a limit to apply this method.

As mentioned above, a suitable method by which a high-density aluminum sediment and an effluent from which aluminum has been removed can be obtained from waste water that contains aluminum besides manganese and magnesium as in an effluent discharged in the smelting of a nickel oxide ore has not been developed.

CITATION LIST

Patent Literature

Patent Literature 1 JP 09-248576 A
Patent Literature 2: JP 2010-207674 A
Patent Literature 3: JP 2000-126510 A
Patent Literature 4: JP 2004-225120 A
Patent Literature 5: JP 2005-350766 A

SUMMARY OF INVENTION

Technical Problem

Therefore, the present invention has been suggested in view of such actual conditions, and provides a method for effluent treatment, by which a high-density, high-concentration aluminum sediment with little adhered water can be separated and recovered from waste water containing aluminum ions, which is discharged in the smelting of a nickel oxide ore.

Solution to Problem

The present inventors did many intensive studies so as to achieve the above-mentioned objects and consequently found that a high-density and high-concentration aluminum sediment can be formed by adding an iron-containing solid to waste water containing aluminum ions in performing a neutralization treatment of the waste water with an alkali, and completed the present invention.

Specifically, the method for effluent treatment in the smelting of a nickel oxide ore according to the present invention is a method for treating waste water that is discharged in the smelting of a nickel oxide ore, including adding an alkali and an iron-containing solid to the waste water containing aluminum ions to form a slurry, and allowing the slurry to stand to perform solid-liquid separation to form an aluminum sediment and an effluent.

In the above-mentioned method for effluent treatment, it is preferable to add the iron-containing solid to the slurry obtained by adding the alkali to the waste water.

Furthermore, it is preferable to add the alkali to the waste water to thereby adjust the pH of the waste water to 4.0 or more.

Furthermore, it is preferable to add the iron-containing solid by an amount that corresponds to 50% by weight or more and 200% by weight or less of the amount of an aluminum sediment that generates in the case when the solid is not added. Furthermore, it is especially preferable to add the iron-containing solid so that the slurry has a specific gravity in the range of 1.1 g/ml or more and 1.4 g/ml or less.

Furthermore, it is preferable that the iron-containing solid is a leached residue obtained by subjecting the nickel oxide ore to high pressure leaching with addition of sulfuric acid.

Advantageous Effects of Invention

According to the present invention, since a neutralization treatment is performed by adding an iron-containing solid the formation of airspaces in the obtained sediment is suppressed, and thus a high-density aluminum sediment can be obtained. Furthermore, since the formation of airspaces is suppressed, an adhered liquid component can be decreased, and a high-concentration aluminum sediment can be obtained, whereby an efficient recover treatment is enabled.

More preferably, formation of a suspending solid in the effluent is suppressed by adding the iron-containing solid after the addition of the alkali, whereby the fining degree of the effluent obtained by separating the aluminum sediment can be increased.

BRIEF DESCRIPTION OF DRAWINGS

The patent or application file contains at least one drawing executed in color. Copies of this patent or patent application publication with color drawings will be provided by the Office upon request and payment of the necessary fee.

DESCRIPTION OF EMBODIMENTS

Figure 1A:
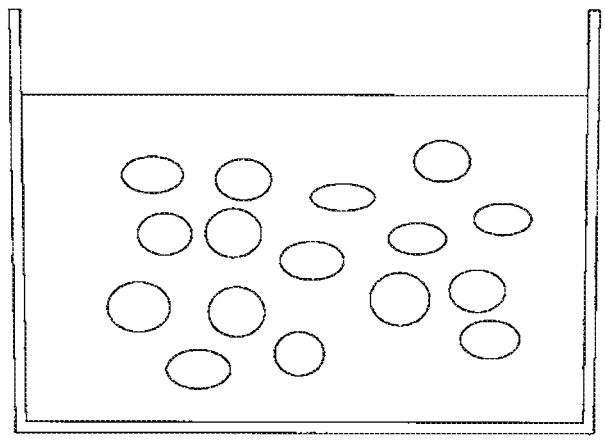
FIG. 1(A) is a drawing that schematically shows an aspect of a cross-sectional surface (an aspect of formation of airspaces) of an aluminum sediment obtained by a conventional method for effluent treatment.

Hereinafter the specific exemplary embodiments (hereinafter referred to as "the present embodiments") of the method for effluent treatment in the smelting of a nickel oxide ore according to the present invention will be explained in detail by the following order with referring to the drawings. The present invention is not limited to the following embodiments, and can be suitably modified within a scope in which the gist of the present invention is not changed.

1. Summary
2. Method for wet smelting of nickel oxide ore
3. Method for effluent treatment
4. Examples

1. SUMMARY

The method for effluent treatment according to the present embodiment is a method for effluent treatment of waste water discharged in the smelting of a nickel oxide ore. This method for effluent treatment enables separation and recovery of an aluminum sediment that has a high density, contains little adhered moisture and has a high concentration, from waste water containing aluminum besides manganese and magnesium, is easily handled, and enables decreasing of the use amount of an agent such as a neutralizer and improvement of the efficiencies of a filtration treatment and the like.

Specifically, in this method for effluent treatment in the smelting of a nickel oxide ore, an alkali and an iron-containing solid are added to waste water containing aluminum ions to form a slurry, and the slurry is allowed to stand to perform solid-liquid separation to form an aluminum sediment and an effluent.

Conventionally, an aluminum sediment has been recovered by separating from other impurity metal components by adding a neutralizer to waste water containing aluminum to adjust the pH to be in the range from 4 to 6. However, in the aluminum sediment obtained by such method, a very large number of large airspaces (represented by circles in the drawing) were formed and thus a honeycomb sediment was formed, as shown by, for example, the cross-sectional schematic drawing in FIG. 1(A), and thus the aluminum sediment became bulky and thus was difficult to handle. Furthermore, by the formation of the airspaces, the liquid component (moisture) that adheres through the airspaces was much, and thus the equipment capacity should be increased in solid-liquid separation, and thus labor and costs were abundantly required. Furthermore, it was necessary to subject the adhered moisture to a neutralization treatment by using a large amount of neutralizer after the recovery of the sediment.

Meanwhile, since the neutralize treatment is performed by adding an alkali and an iron-containing solid is added as mentioned above in the method for effluent treatment according to the present embodiment, the added iron-containing solid acts as a nucleus (seed) for forming the sediment in the process of the formation of the aluminum sediment by the neutralization.

Figure 1B:
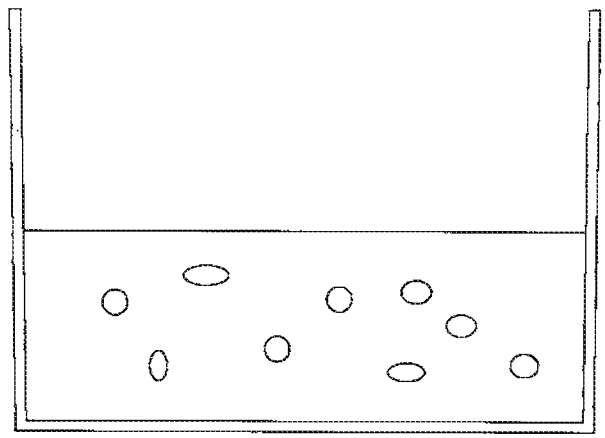
FIG. 1(B) is a drawing that schematically shows an aspect of a cross-sectional surface of an aluminum sediment obtained by the method for effluent treatment of the present embodiment.

By this way, as shown in, for example, in the cross-sectional schematic drawing in FIG. 1(B), the formation of airspaces in the sediment is suppressed, and an aluminum sediment having a high specific gravity is formed. In such aluminum sediment in which the formation of airspaces is suppressed, the volume thereof does not become high, and thus the aluminum sediment is easily handled. Furthermore, since the amount of the adhered moisture is also decreased, a high concentration aluminum sediment is formed, efficient recovery of a sediment can be performed without increasing the capacity of the equipment in the solid-liquid separation, and further, the neutralizer used after the recovery can be effectively saved.

The method for treating the effluent generated in the smelting of a nickel oxide ore according to the present embodiment will be sequentially explained in more detail.

2. METHOD FOR WET SMELTING OF NICKEL OXIDE ORE

Firstly, the method for the wet smelting of a nickel oxide ore will be explained in advance of the specific explanation of the method for effluent treatment according to the present embodiment.

In recent years, as a method for the wet smelting of a nickel oxide ore, a high pressure acid leach process (High Pressure Acid Leach) using sulfuric acid has gained attention. This method includes a consistent wet process and does not include a dry process such as reduction and drying steps unlike a conventional and general method for dry-smelting of a nickel oxide ore, and thus is advantageous in view of energy and cost. Furthermore, this method has an advantage that nickel sulfide with an improved nickel grade can be obtained (see Patent Literature 5). A wet smelting method using the high pressure acid leach process will be explained below as a specific example.

Figure 2:
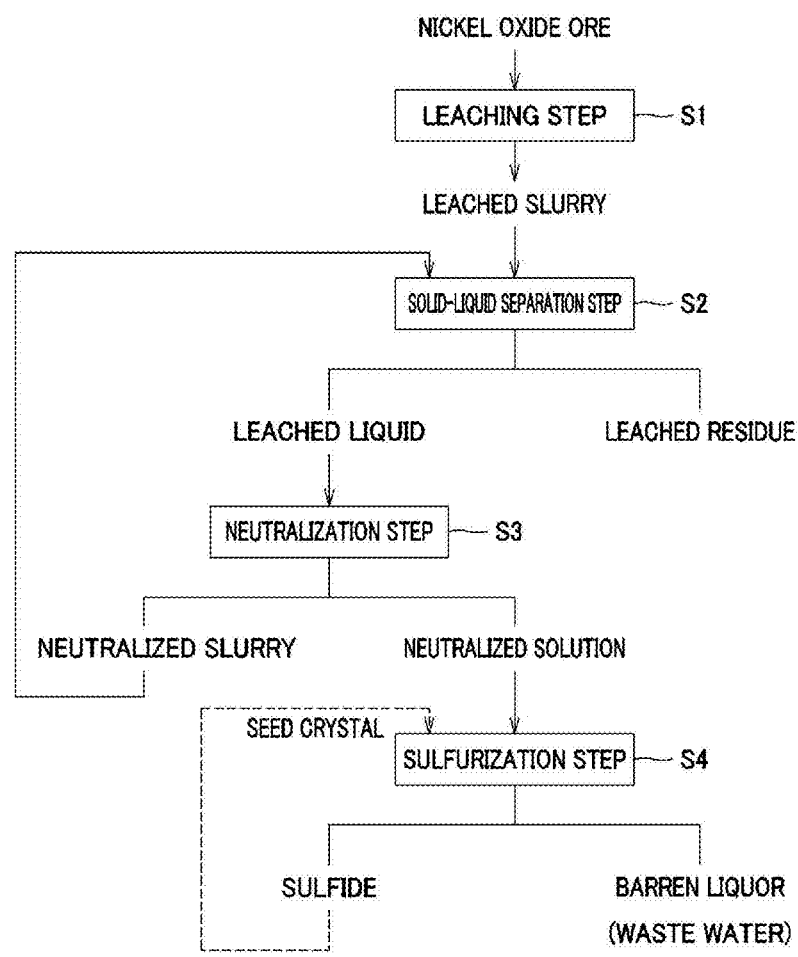
FIG. 2 is a process chart of a wet smelting method by a high pressure acid leach process of a nickel oxide ore.

FIG. 2 shows an example of a process drawing of a method for the wet smelting of a nickel oxide ore by a high pressure acid leach process. As shown in FIG. 2, the method for the wet smelting of a nickel oxide ore includes leaching step S1 in which metals such as nickel and cobalt are leached out of a nickel oxide ore, solid-liquid separation step S2 in which the obtained leached slurry is subjected to solid-liquid separation into a leached liquid and a leached residue, neutralization step S3 in which the leached liquid is neutralized to separate into a neutralized solution for recovering nickel and a neutralized slurry, and sulfurization step S4 in which a sulfurization treatment is performed by blowing a hydrogen sulfide gas into an aqueous sulfuric acid solution, which is the neutralized solution, to thereby give a sulfide containing nickel and cobalt and a barren liquor (waste water).

(1) Leaching Step

In the leaching step S1, sulfuric acid is added to a slurry of a nickel oxide ore, and the mixture is treated by stirring under a temperature of from 220 to 280° C. to form a leached slurry formed of a leached liquid and a leached residue. In the leaching step S1, for example, a high temperature-pressure container (autoclave) is used.

Examples of the nickel oxide ore used in the leaching step S1 mainly include so-called lateritic ores such as limonite ore and saprolite ore. The nickel content in these lateritic ores is generally from 0.8 to 2.5% by weight, and the nickel is contained as a hydroxide or magnesium silicate ore. Furthermore, the content of the iron is from 10 to 50% by weight and the iron is mainly in the form of a trivalent hydroxide (goethite), and bivalent iron is partially contained in the magnesium silicate ore.

Specifically, a leaching reaction and a high temperature thermal hydrolysis reaction represented by the following formulas (i) to (v) occurs in the leaching step S1, and leaching of nickel, cobalt and the like as sulfate salts and fixing of the leached iron sulfate as hematite are performed. However, since the fixing of iron ions does not completely progress, the liquid part of the obtained leached slurry generally contains bivalent and trivalent iron ions besides nickel and cobalt.

Leaching Reaction $$MO + H_2SO_4 \Rightarrow MSO_4 + H_2O \quad (i)$$

(In the formula, M represents, Ni, Co, Fe, Zn, Cu, Mg, Cr, Mn or the like.)

$$2Fe(OH)_3 + 3H_2SO_4 \Rightarrow Fe_2(SO_4)_3 + 6H_2O \quad (ii)$$

$$FeO + H_2SO_4 \Rightarrow FeSO_4 + H_2O \quad (iii)$$

High Temperature Thermal Hydrolysis Reaction $$2FeSO_4 + H_2SO_4 + \tfrac{1}{2}O_2 \Rightarrow Fe_2(SO_4)_3 + H_2O \quad (iv)$$

$$Fe_2(SO_4)_3 + 3H_2O \Rightarrow Fe_2O_3 + 3H_2SO_4 \quad (v)$$

Although the slurry concentration in the leaching step S1 is not especially limited, it is preferable to adjust the slurry concentration of the leached slurry so as to be from 15 to 45% by weight. Furthermore, the additive amount of the sulfuric acid used in the leaching step S1 is not especially limited, and an excess amount such that the iron in the ore leaches is used. For example, the additive amount is set to 300 to 400 kg per 1 ton of the ore. When the additive amount of the sulfuric acid per 1 ton of the ore exceeds 400 kg, it is not preferable since the cost of the sulfuric acid increases.

(2) Solid-Liquid Separation Step

In the solid-liquid separation step S2, the leached slurry formed in the leaching step S1 is subjected to multi-stage washing to give a leached liquid containing nickel and cobalt and a leached residue.

The method for multi-stage washing in the solid-liquid separation step S2 is not especially limited, but it is preferable to use a counter current decantation (CCD) process in which the leached slurry is brought into contact with a counter current of a washing liquid free from nickel. By this way, a washing liquid that is newly introduced in the system can be decreased, and the recovery rates of the nickel and cobalt can be 95% or more.

The leached residue that has been separated and recovered here is an iron-containing solid, and can be added in the method for effluent treatment mentioned below, and can react as a nucleus for fixing the aluminum in the effluent as a sediment.

(3) Neutralization Step

In the neutralization step S3, calcium carbonate or the like is added so that the pH of the leached liquid becomes 4.0 or less, preferably from 3.2 to 3.8 while the oxide of the leached liquid separated in the solid-liquid separation step S2 is suppressed, whereby a neutralized solution for the recovery of nickel and a neutralized slurry containing trivalent iron are formed. In the neutralization step S3, by performing the treatment for the neutralization of the leached liquid by this way, the excess acid used in the leaching step S1 by high temperature-pressured acid leaching is neutralized, and the trivalent iron ions, aluminum ions and the like remaining in the solution are removed. When the pH of the leached liquid goes beyond 4.0, much nickel hydroxide is generated.

The neutralized slurry obtained in the neutralization step S3 can be sent to the slurry solid-liquid separation step S2 as necessary. By this way, the nickel contained in the neutralized slurry can be effectively recovered. Specifically, by returning the neutralized slurry to the solid-liquid separation step S2, which is performed under a low pH condition, the solution of the nickel hydroxide that is generated by the adhered water of the neutralize sediment and the local reaction on the surface of the neutralize sediment can be promoted simultaneously with the washing of the leached residue, and thus the nickel component, which leads to recovery loss, can be decreased.

(4) Sulfurization Step

In the sulfurization step S4, a hydrogen sulfide gas is blown into the aqueous sulfuric acid solution obtained in the neutralization step S3, which is a neutralized solution for recovering nickel, to cause a sulfurization reaction, whereby a sulfide containing nickel and cobalt and a barren liquor are generated.

In the case when zinc is contained in the neutralized solution, a treatment for selectively separating the zinc as a sulfide can be performed in advance of the formation of a sulfide of nickel and cobalt by a sulfurization reaction. As the treatment for selectively separating zinc, the co-precipitation of nickel, which has a higher concentration than that of the zinc, is suppressed by suppressing the velocity of the sulfurization reaction by creating a weak condition in the sulfurization reaction, whereby the zinc is selectively removed.

The neutralized solution is an aqueous sulfuric acid solution containing nickel and cobalt, which is obtained through the neutralization step S3 by leaching a nickel oxide ore as mentioned above. Specifically, for example, the neutralized solution has a pH of from 3.2 to 4.0, a nickel concentration of from 2 to 5 g/L and a cobalt concentration of from 0.1 to 1.0 g/L, and contains, for example, iron, magnesium, manganese, aluminum and the like as impurity components. The impurity metal components are significantly changed depending on the redox potential of the leaching, the conditions for the operation of the autoclave, and the grade of the ore, and generally, iron, magnesium, manganese, aluminum and other impurity metal elements are contained by about several g/L.

Metals such as iron, magnesium, manganese and aluminum that are the impurity metal component contained in the aqueous sulfuric acid solution are present in relatively larger amounts than those of the nickel and cobalt to be recovered, but have low stability in the form of sulfide. Therefore, these impurity metal components are not contained in the formed sulfide, but are contained in a barren liquor (a final liquid of a sulfurization treatment) obtained by removing the formed sulfide. The barren liquor has a pH of about 1.0 to 3.0.

The sulfide containing nickel and cobalt generated in the sulfurization step S4 and the barren liquor containing the impurity metal components are separated and recovered by performing a sedimentation treatment on the slurry thereof by using a sedimentation apparatus such as a thickener. Specifically, the sulfide, which is a precipitated product, is recovered from the bottom of the thickener, and the barren liquor, which is an aqueous solution component, overflows and is recovered. In the method for effluent treatment mentioned below in detail, for example, the barren liquor containing impurity metal components separated and recovered here is treated as an effluent original liquid.

3. METHOD FOR EFFLUENT TREATMENT

Secondly, the method for effluent treatment in the smelting of a nickel oxide ore according to the present embodiment will be explained. In this method for effluent treatment, for example, the barren liquor obtained through the sulfurization step S4 in the above-mentioned smelting of a nickel oxide ore is treated as an effluent original liquid.

As mentioned above, the barren liquor obtained through the sulfurization step S4 is an effluent from which the sulfides of nickel and cobalt obtained by performing the sulfurization treatment on the aqueous sulfuric acid solution as the neutralized solution have been recovered, and is waste water containing aluminum besides iron, magnesium and manganese. Therefore, it is necessary to perform an effluent treatment for removing the residual metal ions in the barren liquor when this barren liquor (waste water) is discharged out of the system.

At this time, the method for effluent treatment according to the present embodiment is characterized in that, in obtaining a sediment containing aluminum as a main component by neutralizing the waste water, an alkali is added to the waste water and an iron-containing solid is added thereto, and the resulted slurry is allowed to stand to perform solid-liquid separation.

Since the iron-containing solid has a heavier specific gravity than that of the generated aluminum sediment, the effluent is neutralized by adding the iron-containing solid together with the alkali, and the solid content thereof becomes a nucleus (seed) for the formed aluminum sediment. By this way, the settleability and filterability during solid-liquid separation are improved, whereby formation of honeycomb airspaces in the gaps of the fine aluminum sediment to lead bulkiness can be suppressed, and adhesion of liquid components (moisture) to the sediment is suppressed, and thus a high concentration aluminum sediment can be generated.

Figure 3:
FIG. 3 is a photograph of the aluminum sediment obtained by a conventional method for effluent treatment (Comparative Example 1).
Figure 4:
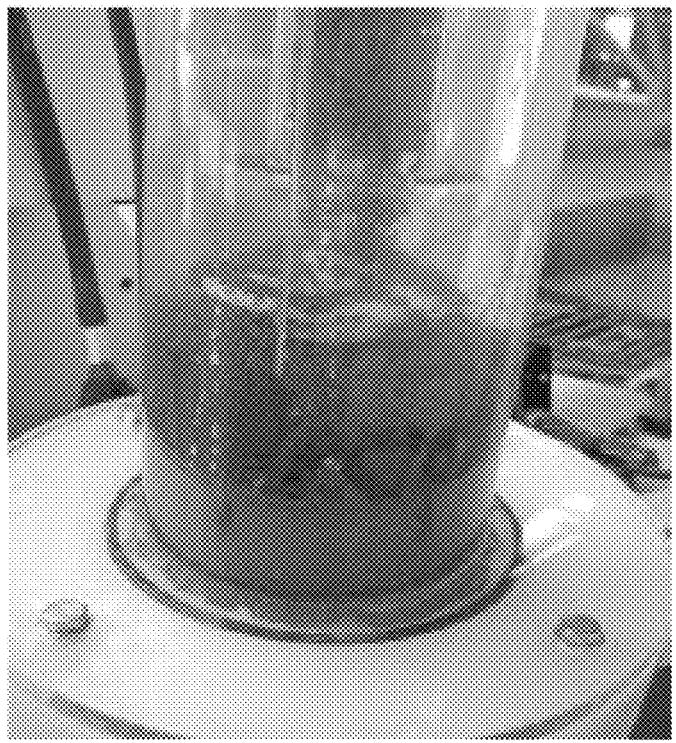
FIG. 4 is a photograph of the aluminum sediment obtained by the method for effluent treatment of the present embodiment (Example 1).

FIG. 3 shows a photograph of an aluminum sediment obtained by a conventional method for effluent treatment. As shown in this FIG. 3, it is understood that a dent generated in the aluminum sediment and the aluminum sediment became very bulky due to the formation of airspaces therein. On the other hand, FIG. 4 is a photograph of the aluminum sediment obtained by the method for effluent treatment according to the present embodiment, specifically, by adding the alkali to the waste water and adding the iron-containing solid thereto, and subjecting the resulted slurry to solid-liquid separation. As shown in this FIG. 4, it is understood that the airspaces clearly decreased more than the aluminum sediment by the conventional method, and thus the density was high and the volume was very low.

The alkali is not especially limited as long as it can increase the pH of the waste water to thereby perform neutralization, and for example, calcium carbonate, calcium hydroxide and the like can be used, and it is especially preferable to use calcium carbonate in view of economic efficiency.

Furthermore, it is preferable to adjust the pH of the waste water to 4.0 or more by the addition of this alkali.

Regarding the adjustment of the pH of the waste water, since the iron-containing solid, which becomes a nucleus for the generation of a sediment mentioned below, is added, it is not necessarily required to increase the pH to about 6.0, which is required for the formation of an aluminum sediment, and it is also not required to adjust the pH to a range of from 8.5 to 9.5, which is required for discharging the effluent, from the first. Specifically, as the pH value to be adjusted, it is sufficient to adjust the pH to 4.0 to 5.0 at which the dissolution of the iron-containing solid added to the waste water can be prevented.

The iron-containing solid is not especially limited as long as it becomes a nucleus for the generation of the aluminum sediment, and for example, the leached residue that is recovered in the leaching step of the wet smelting of a nickel oxide ore can be used. As mentioned above, the leached residue obtained in the leaching step of the smelting of a nickel oxide ore is obtained by mixing a nickel oxide ore and sulfuric acid and leaching the mixture under a high temperature at 240 to 260° C. and a high pressure, and contains hematite as a main component. By using the leached residue in the leaching step of the smelting of a nickel oxide ore by this way, the leached residue recovered in the smelting treatment can be effectively utilized, and an efficient treatment can be performed. Furthermore, since this leached residue has a relatively small difference in specific gravity from the slurry obtained by adding the alkali, a high density aluminum sediment can be generated more effectively.

Although the additive amount of the iron-containing solid is not especially limited, the amount is preferably an amount that corresponds to 50% by weight or more and 200% by weight or less of the amount of an aluminum sediment that generates in the case when the solid is not added (in the case of no addition), and is more preferably an amount that corresponds to 50% by weight or more and 100% by weight or less. This additive amount may be suitably determined by performing a test in which a solid is not added in advance, and determining the amount based on the result of the test.

If the additive amount of the solid is lower than an amount corresponding to 50% by weight of the amount of the aluminum sediment in the case when the solid is not added, it is possible that the solid does not act as a nucleus for the generation of a sediment. On the other hand, even if the additive amount of the solid is more than an amount that corresponds to 200% by weight of the amount of the aluminum sediment in the case when the solid is not added, no difference is seen in the particle size distribution of the obtained aluminum sediment, and the settling velocity is not increased. Furthermore, the amount of the handled product rather increases and the concentration of the suspending solid (SS) increases, and thus it is possible that the clarity is deteriorated. Therefore, the additive amount of the iron-containing solid is preferably an amount corresponding to 50% by weight or more and 200% by weight or less of the amount of the aluminum sediment in the case when the solid is not added, and is more preferably an amount corresponding to 50% by weight or more and 100% by weight or less with further consideration for the viewpoint of clarity.

Furthermore, specifically, it is more preferable that the additive amount of the iron-containing solid is set so that the concentration of the slurry obtained by adding the alkali and the solid is within a range of 1.1 g/ml or more and 1.4 g/ml or less.

As mentioned above, the aluminum sediment obtained by the conventional method for effluent treatment has a very low specific gravity as around 1.1 g/ml. Therefore, for example, when a heavy leached residue of about 5.24 g/ml or more is directly added, the difference in specific gravities is too significant, and a nucleus for the sediment is difficult to be formed, and only the leached residue is precipitated first to form layers, and thus it is possible that the generation of a honeycomb sediment cannot be prevented. Furthermore, the concentration of the aluminum ions in the waste water discharged in the smelting of a nickel oxide ore sometimes becomes a high concentration of about 2 to 6 g/l, and thus a honeycomb sediment is easily formed.

In this regard, by adding a solid such as a leached residue so that the concentration of the obtained slurry is in the range of 1.1 g/ml or more and 1.4 g/ml or less, the solid can be allowed to effectively act as a nucleus for the generation of the aluminum sediment, and the formation of a honeycomb sediment can be surely prevented.

Meanwhile, pure hematite has a specific gravity of about 5.2 to 5.3 g/ml, whereas a leached residue obtained by industrial high pressure leach of a nickel oxide ore contains various components other than hematite such as gangue containing silicon ($SiO_2$) as a main component, chromite ($Cr_3O_4$), or manganese oxide, gypsum generated by neutralization, and these components have lower specific gravities than that of hematite; therefore, an actual leached residue has a specific gravity of a smaller value than this specific gravity.

The timings for adding the above-mentioned alkali and iron-containing solid are not especially limited, but it is more preferable to firstly adjust the pH by adding the alkali to the waste water to raise the pH, and subsequently add the iron-containing solid.

In the case when the leached residue, hematite or the like is added simply as a solid, it is possible that the SS concentration in the filtration after the solid-liquid separation increases, and thus the clarity of the effluent is deteriorated. The reason therefor can be considered that, for example, a part of the leached residue, which is the solid added, is dissolved again by the effluent, which is acidic or weakly acidic, and the dissolved leached residue is suspended as a SS component in the liquid. Furthermore, Patent Literature 4 suggests a method for decreasing SS of a supernatant liquid by miniaturizing an equipment for neutralization and improving filterability by improving the settleability of a neutralized sediment, and specifically shows a method for improving the settleability of the generated neutralized sediment and decreasing the volume of the neutralized sediment, including adding a predetermined amount of hematite in advance to a liquid to be neutralized, and subsequently conducting neutralization by adding calcium carbonate, calcium hydroxide or the like. However, although the SS concentration of the obtained effluent is decreased by this method, the SS concentration is still a high concentration, and is not decreased to a concentration of 100 to 150 mg/l or less, which is generally considered to be clear. Therefore, this method cannot be said to be sufficiently efficient from the viewpoints of environmental preservation and miniaturization of equipment.

Therefore, more preferably, in the method for effluent treatment according to the present embodiment, the pH of the waste water is firstly raised by adding an alkali to thereby give a state in which a solid such as the added leached residue is not dissolved, and the iron-containing solid is then added to the slurry whose pH has been adjusted. By adding the solid to the obtained slurry whose pH has been adjusted by the alkali by this way, the dissolution of the added solid can be suppressed to thereby decrease the generation of SS derived from the solid, and thus a highly clear effluent can be obtained. Furthermore, since the dissolution of the solid can be suppressed, the solid can efficiently act as a nucleus for fixing aluminum, which is light, and thus a high-density aluminum sediment can be obtained more effectively.

In the method for effluent treatment according to the present embodiment, the alkali and iron-containing solid are added to the waste water in the manner mentioned above, and the obtained slurry is allowed to stand to perform solid-liquid separation. When the solid-liquid separation is performed by this way, an aluminum sediment having improved settleability is gradually separated by settling, and can be separated and recovered from the bottom part of a solid-liquid separation apparatus such as a thickener. On the other hand, the effluent obtained by the separation of the aluminum sediment overflows and is recovered.

As mentioned above in detail, in the method for effluent treatment in the smelting of a nickel oxide ore according to the present embodiment, the neutralization treatment is performed by adding the alkali and the iron-containing solid to the waste water containing aluminum ions discharged by the smelting. Furthermore, the obtained slurry is allowed to standing to perform solid-liquid separation, whereby an aluminum sediment and an effluent are formed.

According to such method for effluent treatment, the formation of airspaces in the obtained aluminum sediment is suppressed, and a high density sediment is formed, and thus difficult handling due to increase in volume can be prevented. Furthermore, since the formation of airspaces is suppressed, the amount of the moisture adhered to the sediment decreases and thus a high concentration aluminum sediment is formed, and an efficient recovery treatment in which increase in weight is suppressed can be performed.

Furthermore, especially, the generation of the suspending solid (SS) in the effluent can be suppressed, and the clarity of the effluent (supernatant) obtained by recovering and removing the aluminum sediment can be increased, by adjusting the pH of the effluent by adding the alkali, and then adding the iron-containing solid.

4. EXAMPLES

The Examples of the present invention will be explained below, but the present invention is not limited to the following Examples.

Example 1

To a nickel oxide ore was added concentrated sulfuric acid by 200 to 300 kg per 1 ton of the ore so that the slurry concentration became 1400 to 1500 g/l, and the mixture was mixed to give a slurry. The slurry was charged in a pressure leaching apparatus, the temperature was raised to 245° C., a leaching treatment was performed over 1 hour, and the slurry was removed after 1 hour had passed.

The removed slurry was maintained at 90° C., and neutralized by adding 20% by weight of a calcium carbonate slurry to the slurry until the pH became 2.2 (in terms of 25° C.). Thereafter solid-liquid separation was performed by using a Nutsche funnel and filter paper, whereby a leached liquid and a leached residue were obtained. The leached residue was washed by using water to remove the adhered acid, and recovered.

Subsequently, a calcium carbonate slurry was added to the obtained leached liquid to adjust the pH to about 3.5, whereby impurities were separated. Thereafter, a hydrogen sulfide gas was added to the neutralized liquid as a sulfurizing agent to separate nickel and cobalt as sulfides, whereby waste water having the composition shown in the following Table 1 was obtained as a liquid after the separation. This effluent was deemed as an effluent original liquid.

TABLE 1

|  | Ni | Co | Fe | Mg | Al | Mn |
|---|---|---|---|---|---|---|
| Composition (g/l) | 0.04 | 0.001 | 4.7 | 5~10 | 3.5 | 1.0 |

Secondly, the effluent original liquid having the composition shown in the above-mentioned Table 1 was put into a cylindrical container prepared by a transparent acrylic having an inner diameter of 100 mm and a height of 800 mm, while the liquid temperature was maintained at approximately 50 to 65° C., and a calcium carbonate slurry was added thereto under stirring to adjust the pH to 5.0. At the same time, the above-mentioned leached residue was added as a seed crystal, the mixture was stirred, and the liquid was allowed to stand and the settling of the residue (aluminum sediment) was visually observed. The additive amount of the leached residue was obtained by measuring the amount of a neutralize sediment generated in the case when only lime hydrate was added to the effluent in advance (this case corresponds to Comparative Example 1 mentioned below), an amount that is equal to the amount (equivalent amount) was deemed as the additive amount.

After the settling of the aluminum sediment was completed, the supernatant was collected and passed through a membrane filter having a pore diameter of 0.5 μm, the filter was dried at 60° C. for 48 hours and the weight thereof was measured, and the concentration of the suspending solid content (SS) was calculated. The measured SS concentration was deemed as an index for the evaluation of the clarity of the effluent.

When the sediment that has settled out is observed, as shown in the picture in FIG. 4, no airspace is seen in the sediment, and a high density sediment is obtained. Furthermore, the height of the sediment was measured and found to be 60 mm from the bottom. The effluent up to the upper surface of the sediment was separated, the dry weight of the recovered sediment was measured, and the packed density was calculated from the measured height of the sediment and found to be 30%. Furthermore, the SS concentration was 500 mg/l.

Example 2

A treatment was performed in a similar manner to Example 1, except that an effluent original liquid having the composition shown in the above-mentioned Table 1 was used, and the additive amount of the leached residue was an amount corresponding to 50% by weight of the amount of a neutralize sediment amount generated in the case when only lime hydrate is added.

When the sediment that has settled out is observed, no airspace is seen in the sediment, and a high density sediment is obtained. Furthermore, the height of the sediment was measured and found to be 67 mm from the bottom. The effluent up to the upper surface of the sediment was separated, the dry weight of the recovered sediment was measured, and the packed density was calculated from the measured height of the sediment and found to be 25%. Furthermore, the SS concentration was 400 mg/l.

Example 3

A treatment was performed in a similar manner to Example 1, except that an effluent original liquid having the composition shown in the above-mentioned Table 1 was used, and a calcium carbonate slurry was firstly added to thereby adjust the pH to be in the range from 4 to 6, and the leached residue was then added after confirming that the pH had become stable in the neutralization treatment. In addition, after the leached residue was added and the mixture was homogeneously dispersed, the pH was maintained to be within 4 to 6 while the stirring was continued.

When the sediment that has settled out is observed, no airspace was seen in the sediment, and a high density sediment was obtained. Furthermore, the height of the sediment was measured and found to be 60 mm from the bottom. The effluent up to the upper surface of the sediment was separated, the dry weight of the recovered sediment was measured, and the packed density was calculated from the measured height of the sediment and found to be 30%. Furthermore, the SS concentration was 100 mg/l. Accordingly, it was found that the clarity of the obtained effluent can be extremely improved by adjusting the pH by adding an alkali and adding the leached residue to thereby form a sediment.

Comparative Example 1

A treatment was performed in a similar manner to Example 1, except that an effluent original liquid having the composition shown in the above-mentioned Table 1 was used, and only a lime hydrate slurry was added to thereby adjust the pH to 5.0 without adding the leached residue.

When the supernatant was collected and measured after the still standing, the SS concentration was 100 mg/l, and the clarity was high. However, when the height of the sediment was measured, the height was 140 mm from the bottom, and the density was very low as 15 to 17%. Furthermore, when the precipitate was collected and observed, honeycomb airspaces were seen, and when the sediment was gored by a collection spoon, the airspaces were crushed and a dent was generated as shown in the picture of FIG. 3.

The invention claimed is:

1. A method for treatment of waste water that is discharged in the smelting of a nickel oxide ore, comprising:
   adding an alkali and an iron-containing solid to the waste water containing aluminum ions to form a slurry; and
   allowing the slurry to stand to perform solid-liquid separation to form an aluminum sediment and an effluent;
   wherein the iron-containing solid is a leached residue obtained by subjecting the nickel oxide ore to high pressure leach with addition of sulfuric acid.

2. The method for treatment of an effluent in the smelting of a nickel oxide ore according to claim 1, wherein adding an alkali and an iron-containing solid to the waste water containing aluminum ions to form a slurry comprises:
   adding the alkali to the waste water to form a slurry, and then
   adding the iron-containing solid to the slurry.

3. The method for treatment of an effluent in the smelting of a nickel oxide ore according to claim 1, wherein the alkali is added to the waste water in an amount to adjust the pH of the waste water to 4.0 or more.

4. The method for treatment of an effluent in the smelting of a nickel oxide ore according to claim 1, wherein the iron-containing solid is added in an amount that corresponds to 50% by weight or more and 200% by weight or less with respect to an amount of an aluminum sediment that generates in the case when the solid is not added.

5. The method for treatment of an effluent in the smelting of a nickel oxide ore according to claim 4, wherein the iron-containing solid is added in an amount so that the slurry has a specific gravity in a range of 1.1 g/ml or more and 1.4 g/ml or less.

* * * * *